F. O. MATTHIESSEN.
Making Sugar.

No. 66,369.

Patented July 2, 1867.

Witnesses:
Henry T. Brown
Geo. W. Reed

Inventor:
F. O. Matthiessen

United States Patent Office.

FRANZ O. MATTHIESSEN, OF JERSEY CITY, NEW JERSEY.

Letters Patent No. 66,369, dated July 2, 1867.

---

IMPROVEMENT IN SUGAR-CRYSTALLIZING TANKS OR WAGONS.

---

*The Schedule referred to in these Letters Patent and making part of the same.*

---

TO ALL WHOM IT MAY CONCERN:

Be it known that I, FRANZ O. MATTHIESSEN, of Jersey City, in the county of Hudson, and State of New Jersey, have invented a new and useful improvement in Sugar-Crystallizing Tanks or Wagons, of which the following is a full, clear, and exact description, reference being had to the accompanying drawing, forming part of this specification, and in which—

Figure 1:
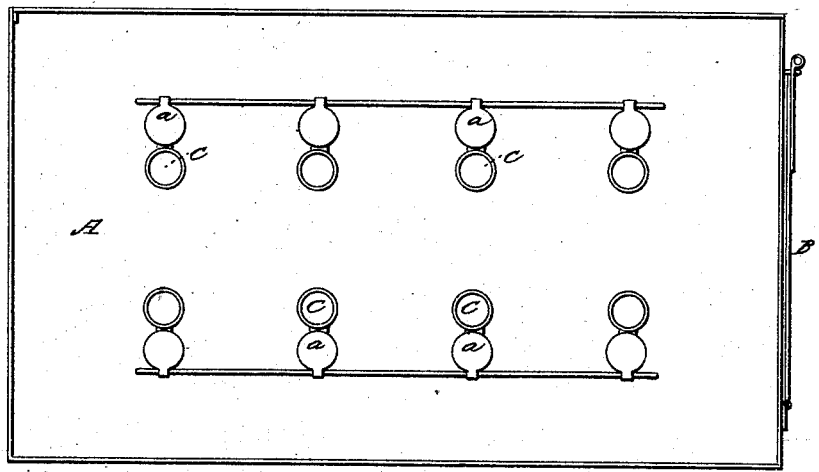
Figure 2:
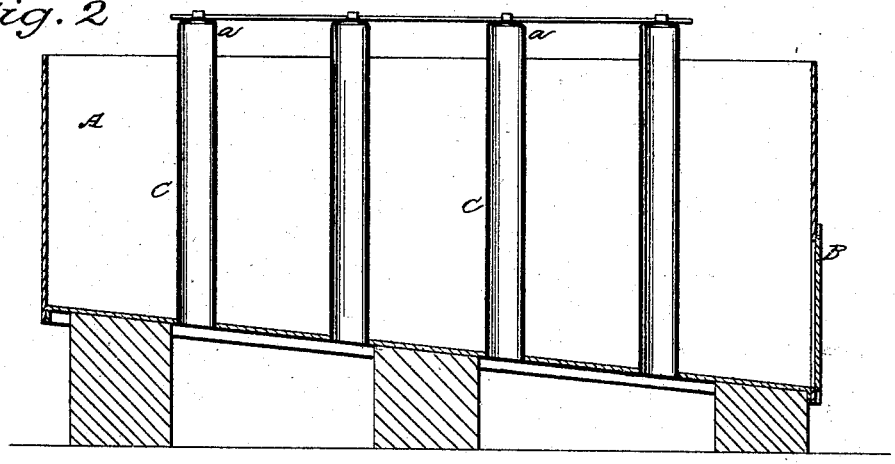

Figure 1 represents a plan of a crystallizing-tank constructed according to my improvement, and Figure 2 a vertical longitudinal section of the same.

Similar letters of reference indicate corresponding parts.

The object of my invention is to prevent the fermentation and overflow or rising of the mass, which usually takes place in the tanks or wagons into which the sirup and molasses are run from the boiling-apparatus, whether a vacuum or other pan, as used in sugar-refineries for the purpose, by allowing the mass to stand, of effecting the necessary crystallization, and the nature of my invention consists in providing said tanks or wagons with one or more pipes or tubes through the body of them, said pipes being open at their ends and provided with a damper or dampers for circulating and shutting off the passage of air through them to regulate the temperature and condition of the interior portion of the mass, whereby the result sought to be obtained is secured.

Referring to the accompanying drawing, A represents a crystallizing-tank or vat, which, if desired, may be on wheels to form a wagon, and into which the sirup and molasses are run to effect the crystallization of the sugar contained in them. B is its discharge opening or door, and C pipes or tubes, of which there may be any suitable number, the same being opened at their ends and arranged to project through the mass or body portion of the tank, with dampers or valves $a$ at either or both of their ends, and which, where a series of tubes is used, may be geared together for joint action. These dampers should be kept closed for about twenty-four (24) hours more or less after the sirup and molasses have been run into the tank, to prevent air from circulating through the pipes C, after which said dampers may be more or less opened to allow of a current or currents of air passing through them, which will regulate the temperature of the interior portion of the mass, so as to approximate in a measure to that of the exterior and prevent that fermentation and rising or overflowing of the mass which usually takes place at the centre or interior in tanks or wagons not so provided with controllable air tubes. The tubes C may be arranged horizontally, or in any other position than that represented.

What I claim as my invention, and desire to secure by Letters Patent, is—

The combination, with a tank or wagon, of an air pipe or air pipes or tubes arranged to project through the body of the tank, and open at its or their ends, with a valve or valves to exclude or control the circulation of air, substantially as and for the purpose or purposes specified.

F. O. MATTHIESSEN.

Witnesses:
HENRY T. BROWN,
J. W. COOMBS.